United States Patent [19]
Armstrong

[11] 4,084,711
[45] Apr. 18, 1978

[54] ROUND HAY BALE LOADING AND UNLOADING CARRIER

[76] Inventor: T. Wayne Armstrong, Rte. 1, Branch, Ark. 72928

[21] Appl. No.: 812,924

[22] Filed: Jul. 5, 1977

[51] Int. Cl.² .............................................. B60P 1/04
[52] U.S. Cl. ............................... 214/1 HH; 214/85.5; 214/353; 214/501; 214/DIG. 4
[58] Field of Search .................. 214/85.5, 130 C, 144, 214/1 HH, 1 HA, 350, 351, 352, 353, 354, 501, 506, DIG. 4

[56] References Cited

U.S. PATENT DOCUMENTS

| | | | |
|---|---|---|---|
| 3,013,677 | 12/1961 | Thompson | 214/506 X |
| 3,424,326 | 1/1969 | Thatcher | 214/85.5 X |
| 3,938,682 | 2/1976 | Rowe | 214/353 |
| 3,944,095 | 3/1976 | Brown | 214/506 |
| 3,964,621 | 6/1976 | Youngkamp | 214/85.5 |
| 3,985,253 | 10/1976 | Kannady et al. | 214/506 |
| 4,044,907 | 8/1977 | Craft | 214/506 |

*Primary Examiner*—L. J. Paperner
*Attorney, Agent, or Firm*—Ralph R. Pittman

[57] ABSTRACT

A carrier for large cylindrical bales of hay has a normally nearly flat bale-receiving framework which is tiltable to an upright position by a pushing movement of an associated towing vehicle. A winch-cable device is utilized to first pull a bale looped by the cable from any one of a number of lateral or linear locations to engagement with the upright framework, and then to tightly compress the bale against the framework. A bayonet structure is driven into the bale as it is compressed, and a pulling movement of the towing vehicle returns the framework to its normal orientation. The bale is dumped by removing the cable loop and again upwardly tilting the bale receiving framework.

10 Claims, 11 Drawing Figures

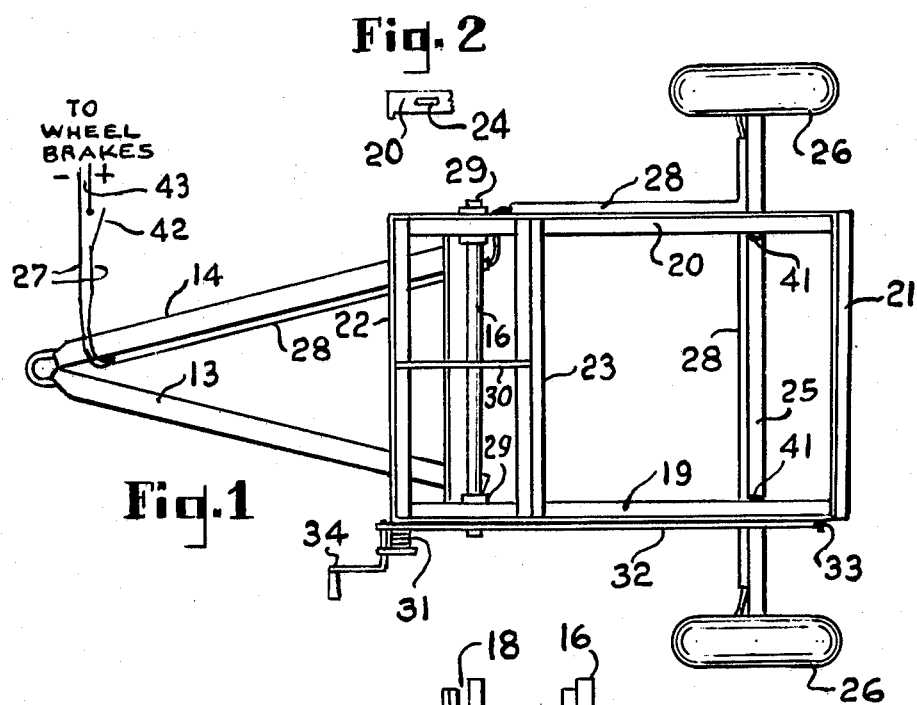
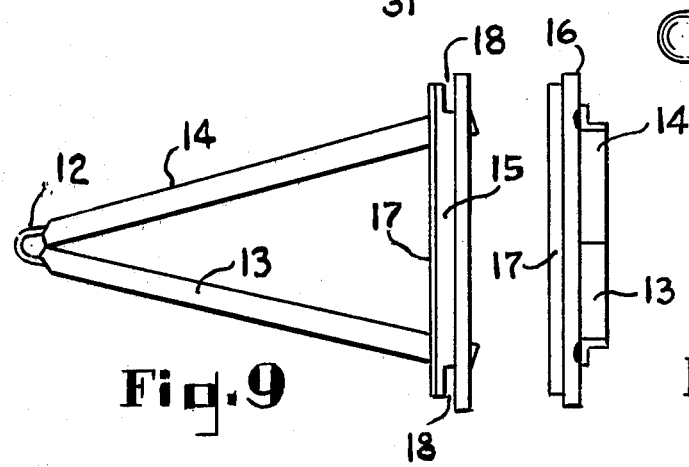
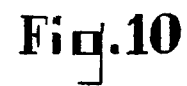
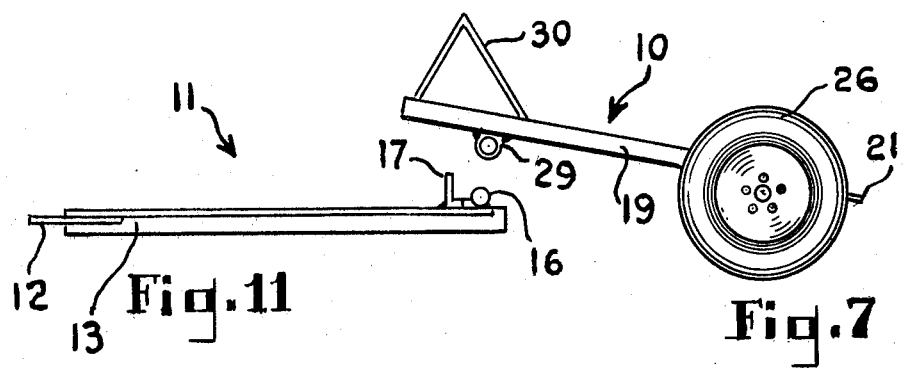
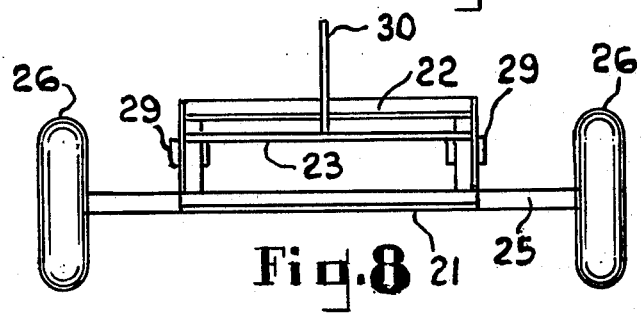

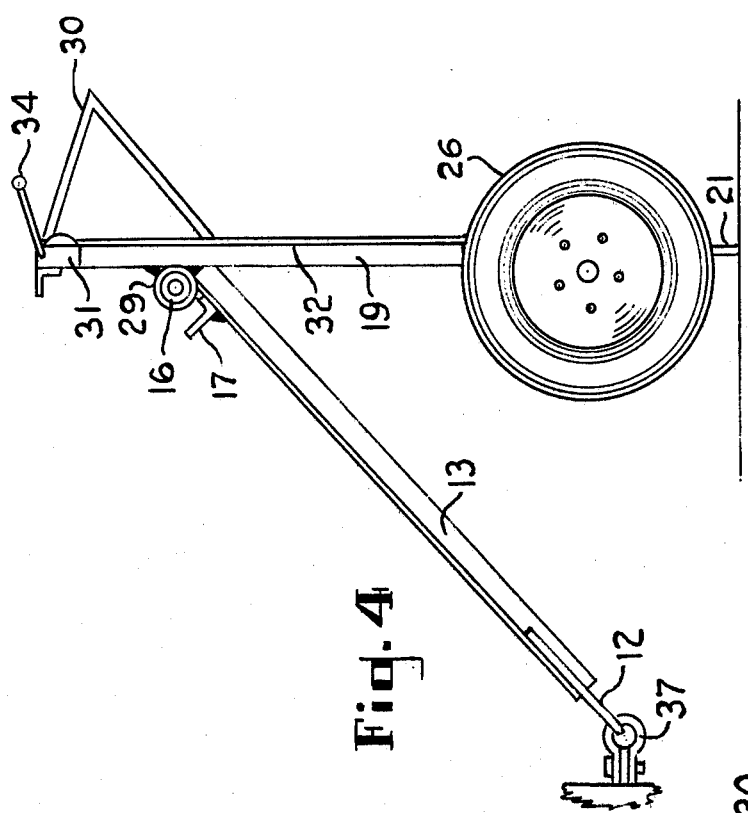
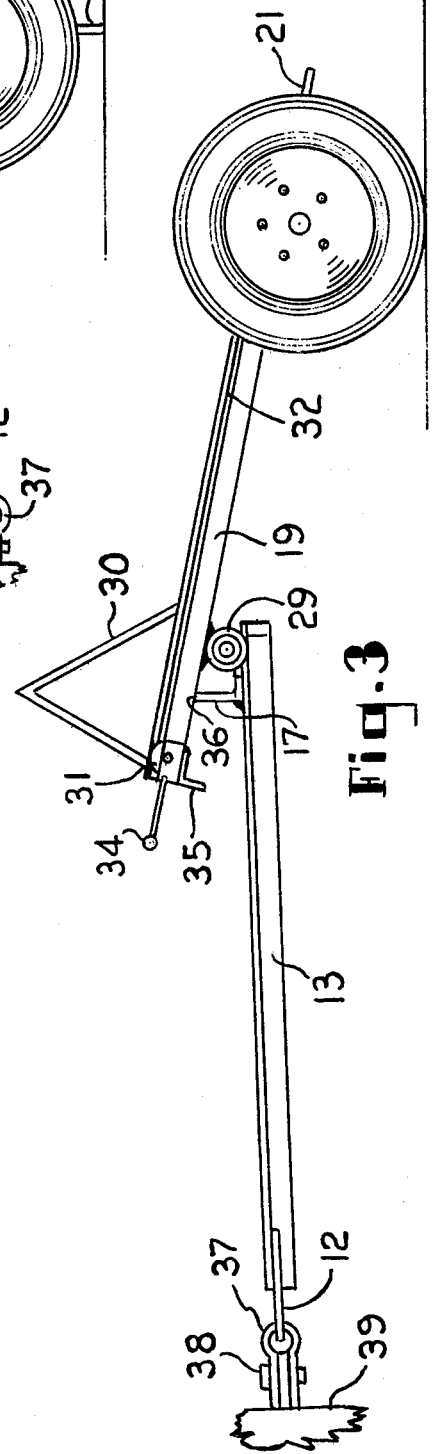

ROUND HAY BALE LOADING AND UNLOADING CARRIER

BACKGROUND OF THE INVENTION

Descriptions of a number of carriers for loading, transporting and unloading large cylindrical bales of hay appear in the prior art. Bales having a length of six feet (1.83 meters) and a diameter of seven feet (2.12 meters) are not unusual, and while certain of the prior art structures appear capable of handling such bales, their size as shown in most disclosures is also correspondingly large.

It has been found that the hay bale as it is structured by the baler may be readily moved by tensioning a single loop of a flexible cable around the bale, and that the cable so used may be as small as compatible with the tensile strength needed to slide the bale. It has also been found that the large bale can be satisfactorily held for transport while lashed tightly against a framework which is very much smaller than the bale to be handled.

SUMMARY OF THE INVENTION

The carrier for large round hay bales described herein is intended for operation with powered vehicle for use in both loading, transporting and unloading the bale. A forward triangular framework has one leg formed as a transversely extending shaft, and a slightly downwardly sloping tiltable rectangular bale-receiving framework is rotatively mounted on the shaft near the forward end of the latter framework.

The rearward bale-receiving framework is mounted, near its rearward end, upon a pair of wheels equipped with brakes which can be set to lock the wheels to the bale-receiving framework.

A rearwardly projecting portion of the bale-receiving framework extends beyond the rearmost portion of the periphery of the wheels, and as the bale-receiving framework is urged upwardly concurrently with a rearward movement of the forward triangular framework when the brakes are set, the composite of wheels and bale-receiving framework is rolled rearwardly until stopped by the engagement of the rearwardly projecting bale-receiving framework with the ground.

This procedure sets the bale-receiving framework in a stable upright position. A winch and associated flexible cable are mounted on the upper end of one of the longitudinal legs of the bale-receiving framework, the cable having a terminal hook engageable through an aperture with the upper end of the other longitudinal leg, providing a cable loop which may be extended from the carrier as needed to loop around a hay bale.

As the extended cable is reeled in by the winch, the cable indents itself along its line of contact with the bale, securing it in place on the bale as the bale is pulled toward and finally compressed against the bale-receiving framework. A two-legged bayonet having its legs in a vertical plane projects from the upper central portion of the bale-receiving framework, being forced into an upper midportion of the hay bale as the cable loop is tightened, and thereby precluding lateral movement of the bale during its handling.

Following the attachment of the bale to the bale-receiving framework, a forward movement of the forward triangular framework returns the carrier to the initial configuration, and after brake release, a loaded bale may be transported by towing the carrier. In unloading, if release of the loop holding the bale does not satisfactorily unload the bale, the bale-receiving framework may be tilted as necessary to roll the bale from the carrier.

While it is essential that the wheel spacing of the carrier be at least equal to the length or width of the bale to be handled, the width of the bale-receiving framework needs only to be wide enough to enable the bale to be securely lashed thereto, and while the loaded bale may span the entire distance between the wheels, the width of the framework against which the bale is compressed need be only slightly more than one-half of the wheel spacing or bale length.

BRIEF DESCRIPTION OF THE DRAWING

FIG. 1 is a plan view of the carrier as extended for towing;

FIG. 2 is a fragmentary side elevational view of an upper portion of the bale-receiving framework, showing the aperture into which the terminal hook of the winch cable is inserted;

FIG. 3 is a side elevation of the carrier as extended for towing;

FIG. 4 is a side elevation of the carrier in position to receive a hay bale;

FIG. 7 is a side elevation of the rearward rectangular bale-receiving framework;

FIG. 8 is a rear elevation of the wheeled bale-receiving framework;

FIG. 9 is a plan view of the forward triangular framework, one leg of which is horizontally extending shaft;

FIG. 10 is a rear elevation of the forward triangular framework; and

FIG. 11 is a side elevation of the forward triangular framework.

DESCRIPTION OF THE PREFERRED EMBODIMENT

Figure 5:
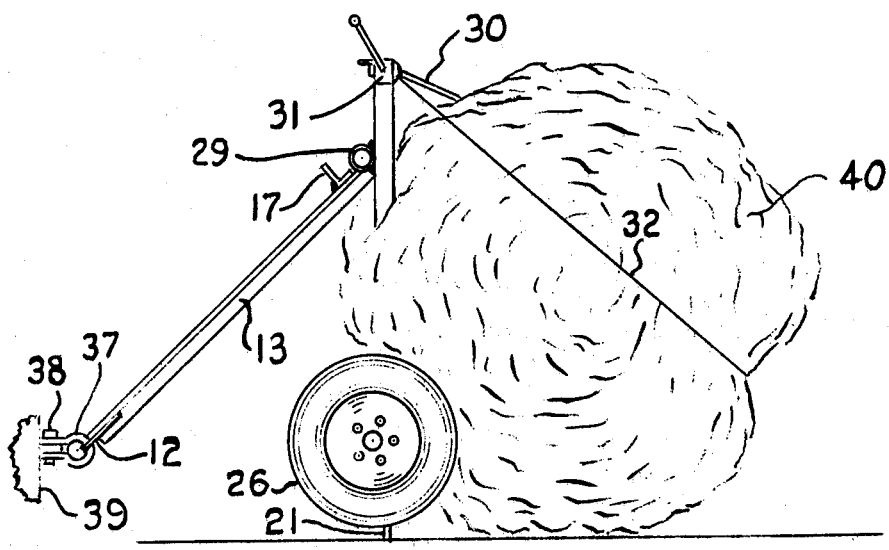
FIG. 5 shows a hay bale compressed against the bale-receiving framework after having been drawn to the carrier by the winch cable loop.
Figure 6:
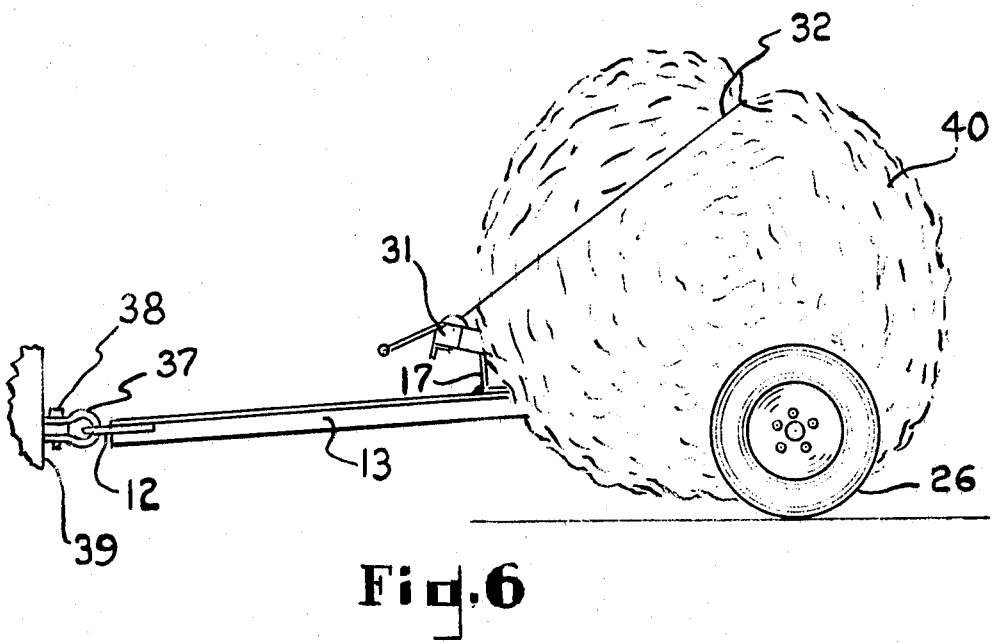
FIG. 6 shows the carrier loaded with a bale ready for transport.

In the drawing, FIGS. 5 and 6 illustrate the carrier in service with a round bale of hay thereon; FIGS. 1, 3 and 4 show the carrier members in the loading and carrying positions without load.

The carrier includes two principal structural assemblies; a rearward rectangular wheeled bale-receiving framework 10 and a forward shafted triangular framework 11, the latter defining an isosceles triangle.

As shown in FIGS. 9, 10 and 11, the angles 13 and 14, of equal length, are joined at their forward ends by the hitch loop 12, diverging rearwardly therefrom, their rearward transversely spaced ends being joined by the transversely extending shaft 16 and the forwardly spaced coextensive angle 15, all of the members being joined by welding to yield a rigid structure. The end portions of the shaft 16 project laterally beyond the spaced ends of the members 13 and 14, and a portion of each end of the lower flange of the angle 15 is cut away to form the inwardly extending cavities 18 to provide space for a sleeve bearing around the shaft.

The bale-receiving rectangular framework 10 has a pair of angles defining the first and second longitudinally extending side members 19 and 20 respectively, and are joined at their forward and rearward ends by the transversely extending angles 22 and 21 respectively. The axle 25 extends transversely across the underside of the bale-receiving framework, the end portions of the axle projecting outwardly therefrom, and a wheel 26 is rotatively mounted on each end of the axle. As shown in FIGS. 3 and 7, the axle is welded to the bale-receiving framework at a location, indicated by the numeral 41 in FIG. 1, such that the radius of the wheels is less than the distance from the axis of the axle to the outside of the angle 21, so that a portion of the angle 21 projects rearwardly beyond a vertical plane tangent to the rearmost peripheral surface of the wheels.

A sleeve bearing 29 is welded to the underside of each of the angles 19 and 20, the bearings being axially aligned with the axis parallel to the forward angle 22 and spaced rearwardly therefrom. The shaft 16 is rotatively received in the bearings 29, and a forward portion of the rectangular bale-receiving frame rests upon the upwardly extending flange 17 of the transverse angle 15, as indicated at the numeral 36 in FIG. 3, limiting downward movement of the forward end of the bale-receiving framework about the axis of the axle 25, and at the same time permitting a swingable upward movement of the forward end of the bale-receiving framework about the axle axis.

To preclude undesired passage inwardly of portions of a handled hay bale through the bale receiving framework, an equally flanged angle 23 is secured rearwardly from the forward end angle, extending transversely between the longitudinal angles 19 and 20, the angle 23 being disposed with the junction of its flanges pointing upwardly, and to prevent unwanted lateral movement of a hay bale being handled, a centrally located V-shaped bale-penetrating bayonet 30 spans the space between the forward angle 22 and the intermediate angle 23, extending upwardly and rearwardly therefrom. The bayonet is conveniently formed of steel pipe and welded to the angles 22 and 23.

From the source of electrical energy symbolically indicated at the numeral 43 (FIG. 1) a pair of conductors 27, into one of which is serially connected the switch 42, pass through the conduit 28 to an electromagnetic brake in each of the wheels, the closing of the switch energizing the brakes for locking the wheels to the axle 25.

A stub angle 35 (FIG. 3) is welded to the underside of the forward end of the angle 19, projecting outwardly therefrom to provide a support for the attached winch 31, the latter being shown as manually operable by the hand crank 34, although in some situations a motor driven winch may be preferred. A long flexible winch cable 32 is wound around the drum of the winch, the cable when not in use having a portion running along the outside of the angle 19 and terminating at the hook 33 (FIG. 1).

The carrier may be operated connected to any vehicle which will actuate its movable members; in the drawing the associated vehicle is fragmentarily shown at the numeral 39. The clevis 37 is secured thereto by the coupling pin 38, the outer loop of the clevis being loosely but securely attached to the hitch loop 12 of the carrier.

Assuming the carrier to be in the position shown in FIGS. 1 and 3 and that the switch 42 is closed to lock the wheels, a rearward movement of the hitch loop 12 will lift the rectangular bale-receiving framework from its rest 36 on the flange 17, rotatively turning the bale-receiving framework toward a vertical position. Concurrently the bearings 29 turn on the shaft 16, and since the bearings are fixed on the bale-receiving framework and the wheels are locked to their axle, the wheeled framework constitutes a rigid structure, necessitating a partial rearward turn of the locked wheels.

As the rigid structure is rotatively moved, the rearwardly projecting portion of the angle 21 is turned to first engage the ground surface and subsequently, as the turning continues, to lift the wheels from engagement with the ground, setting the rectangular bale-receiving framework in a stable upright position, at rest on the angle 21 as shown in FIG. 4.

In operation, the carrier is placed near the round hay bale to be moved, the bale-receiving framework is raised to the upright position, sufficient flexible cable is unreeled from the winch to extend around the bale, and the terminal hook of the cable fastened at the aperture 24 (FIG. 1).

The position of the bale with respect to that of the carrier is not critical; the bale may be located either directly in line with the carrier, or spaced laterally on either side therefrom.

After the hook is attached, the looped bale is pulled to the carrier and lashed tightly against the upstanding bale-receiving framework by operating the winch, the bale 40 being held by the winch cable as illustrated in FIG. 5.

Following the attachment of the bale to the upright bale-receiving framework, a forward movement of the actuating vehicle will return the bale-carrying framework to the position shown in FIG. 6, and thereafter the locked wheels may be released and the bale towed to its destination.

The transported bale may be unloaded by removing the lashing cable, which will permit the bale to be either manually rolled off of the bale-receiving framework, or if desired, the bale may be dumped as the bale-receiving framework is partially re-erected toward the upstanding position.

What is claimed is:

1. A round bale loading and transporting carrier comprising a forward triangular framework having a pair of legs diverging rearwardly from a forwardly disposed junction and a transversely extending shaft rigidly joined to the rearward ends of said pair of legs and defining the third leg of said triangular framework;

a rectangular framework having first and second longitudinal side members and transverse forward and rearward end members;

coaxially opposed bearings secured to said first and second side members respectively near the forward end member, said shaft being rotatively received in said bearings for hingedly connecting said frameworks;

a transversely extending axle rigidly secured near said rearward end member to said longitudinal side members and projecting outwardly therefrom, a wheel rotatively mounted on each of the axle projections and brake means for selectively locking said wheels to said axle;

said rectangular framework sloping downwardly from the forward end member to the rearward end member and having a width of the order of one-half the spacing of said wheels;

a transversely extending stop member rigidly secured to said triangular framework in the downward path of movement of the forward end portion of said rectangular framework;

said rectangular framework moving from the sloping position to an upright position concurrently with a rearward movement of the forward end of said triangular framework when said wheels are locked to said axle; and winch means mounted on the upper end of said first side member, a flexible cable wound in said winch means and extending therefrom to a terminal hook, and means located at the upper end of said second side member for receiving said hook in connected relationship therewith.

2. The carrier as claimed in claim 1, wherein the configuration of the forward triangular framework defines an isosceles triangle in which said shaft forms the unequal leg.

3. The carrier according to claim 1, in which the configuration of the rectangular framework defines an elongate rectangle.

4. The carrier as defined in claim 1, wherein the upper surface of said stop member is disposed in a horizontal plane extending at an elevation above the axis of said axle and said rectangular framework slopes downward rearwardly and upward forwardly from said stop member.

5. The carrier as defined in claim 1, in which said transverse rearward end member is a flanged structural shape and a portion of a flange projects rearwardly from said axle a distance greater than the radius of said wheels for providing a narrow soil-penetrating support effective to stablize the rectangular framework in upright position.

6. The carrier as claimed in claim 1, wherein said stop member is located forwardly from said shaft and coextensive therewith.

7. The carrier according to claim 6, in which said stop member is a flanged structural shape and a portion of one flange is disposed at an elevation above the topmost surface of said shaft.

8. The carrier as defined in claim 1, wherein a rigidly fixed bale-engaging intermediate member extends transversely between the longitudinal side members of said rectangular framework.

9. The carrier in accordance with claim 8, wherein a V-shaped bale-penetrating bayonet projects upwardly from said rectangular framework, the legs of which are secured to the forward end member and said intermediate member respectively.

10. The carrier as set forth in claim 1, wherein said bearings are mounted on the underside of said longitudinal side members.

* * * * *